United States Patent
Fredlund et al.

(10) Patent No.: US 7,742,083 B2
(45) Date of Patent: Jun. 22, 2010

(54) IN-CAMERA DUD IMAGE MANAGEMENT

(75) Inventors: John R. Fredlund, Rochester, NY (US);
Joseph A. Manico, Rochester, NY (US);
Elena A. Fedorovskaya, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 912 days.

(21) Appl. No.: 11/403,352

(22) Filed: Apr. 13, 2006

(65) Prior Publication Data

US 2007/0242945 A1 Oct. 18, 2007

(51) Int. Cl.
*H04N 5/76* (2006.01)
(52) U.S. Cl. .................................... 348/231.2
(58) Field of Classification Search .......... None
See application file for complete search history.

(56) References Cited

U.S. PATENT DOCUMENTS

| | | | |
|---|---|---|---|
| 4,887,121 A | 12/1989 | Pritchard | |
| 6,535,636 B1 * | 3/2003 | Savakis et al. | 382/173 |
| 6,671,405 B1 | 12/2003 | Savakis et al. | |
| 6,993,180 B2 | 1/2006 | Sun et al. | |
| 7,362,354 B2 * | 4/2008 | Lin | 348/222.1 |
| 2003/0128389 A1 | 7/2003 | Matraszek et al. | |
| 2004/0075743 A1 | 4/2004 | Chatani et al. | |
| 2004/0179719 A1 | 9/2004 | Chen et al. | |
| 2005/0105775 A1 | 5/2005 | Luo et al. | |
| 2005/0147298 A1 | 7/2005 | Gallagher et al. | |
| 2005/0219367 A1 * | 10/2005 | Kanda et al. | 348/207.2 |
| 2006/0017820 A1 * | 1/2006 | Kim | 348/231.2 |
| 2006/0082672 A1 * | 4/2006 | Peleg | 348/333.01 |
| 2006/0126093 A1 * | 6/2006 | Fedorovskaya et al. | 358/1.14 |
| 2006/0280427 A1 * | 12/2006 | Snowdon et al. | 386/46 |
| 2007/0053557 A1 * | 3/2007 | Cahill et al. | 382/128 |
| 2007/0242138 A1 * | 10/2007 | Manico et al. | 348/231.3 |
| 2007/0263092 A1 * | 11/2007 | Fedorovskaya et al. | 348/207.1 |

OTHER PUBLICATIONS

U.S. Appl. No. 11/406,686, filed Apr. 13, 2006, Elena A. Fedorovskaya et al., Value Index From Incomplete Data, (D-91875).
J. Pearl, Probabilistic Reasoning in Intelligent Systems, San Francisco, California, Morgan Kaufrnami, 1988.
B.D. Ripley, Pattern Recognition and Neural Networks. Cambridge University Press, 1996.

* cited by examiner

*Primary Examiner*—Justin P Misleh
(74) *Attorney, Agent, or Firm*—Robert L. Walker

(57) ABSTRACT

In an image record organization method, camera, and system, a plurality of image records are provided and a value index is determined for each of the image records. The image records are classified into unacceptable records having respective value indexes within a predetermined threshold and acceptable records having respective value indexes beyond the threshold. The unacceptable records are demarcated from the acceptable records.

20 Claims, 6 Drawing Sheets

| separate unacceptable records from acceptable records |
| --- |
| group unacceptable records separately from acceptable records |
| block fulfillment of unacceptable images |
| automatically discard unacceptable image records and retain acceptable image records |
| selectively display indications of unacceptable image records and accept user input selectively authorizing discarding or retaining |

Fig. 2

IN-CAMERA DUD IMAGE MANAGEMENT

CROSS REFERENCE TO RELATED APPLICATIONS

Reference is made to commonly assigned, co-pending U.S. patent application Ser. No. 11/403,583, entitled CAMERA USER INPUT BASED IMAGE VALUE INDEX, filed Apr. 13, 2006, in the names of Joseph A. Manico, John R. Fredlund, Elena A. Fedorovskaya, and Douglas B. Beaudet.

Reference is made to assigned, co-pending U.S. patent application Ser. No. 11/403,686, entitled VALUE INDEX FROM INCOMPLETE DATA, filed Apr. 13, 2006, in the names of Elena Fedorovskaya, Serguei Endrikhovski, John R. Fredlund and Joseph A. Manico.

FIELD OF THE INVENTION

The invention relates to digital cameras and image organization methods and more particularly relates to in camera dud image management.

BACKGROUND OF THE INVENTION

Digital imaging has vastly increased users ability to amass very large numbers of still images, video image sequences, and multimedia records combining one or more images and other content. (Still images, video sequences, and multimedia records are referred to collectively herein with the term "image records".) With very large numbers of image records, management becomes difficult.

Efforts have been made to aid users in organizing and utilizing image records by assigning metadata to individual image records that indicates a metric of expected value to the user. U.S. Patent Publication No. 2003/0128389 A1, filed by Matraszek et al., discloses another measure of image record importance, "affective information", which can take the form of a multi-valued metadata tag. The affective information can be a manual entry or can be automatically detected user reactions, including user initiated utilization of a particular image, such as how many times an image was printed or sent to others via e-mail. In either case, affective information is identified with a particular user. U.S. Pat. No. 6,671,405 to Savakis et al, discloses another approach, which computes a metric of "emphasis and appeal" of an image, without user intervention. A first metric is based upon a number of factors, which can include: image semantic content (e.g. people, faces); objective features, such as colorfulness and sharpness; and main subject features, such as size of the main subject. A second metric compares the factors relative to other images in a collection. The factors are integrated using a trained reasoning engine. U.S. Patent Publication No. 2004/0075743 is somewhat similar and discloses image sorting of images based upon user-selected parameters of semantic content or objective features in the images. These approaches place much effort into valuing of all of the images in a collection.

U.S. Pat. No. 6,535,636 is directed to a method for detecting "dud images", that is, unacceptable images, to determine images that are undesirable for placing in albums.

All of these approaches are useful, particularly in an environment, in which a user is making a deliberate effort to organize images, for example, in creating an album. Another environment, in which image management is needed is during a picture taking session with a digital still camera, cell phone camera, or the like. Some digital cameras, such as, the V-550 digital camera marketed by Eastman Kodak Company of Rochester, N.Y., include a user control labeled "Share", which can be actuated by the user to designate a respective image for preferential printing and e-mailing. It is convenient to use this user control during a picture taking session to identify images the user considers particularly good. Another environment, in which image management is an issue, is in devices having limited image handling capabilities relative to the overall requirements of a collection of images, such as an image viewer having limited storage capacity relative to received sets of images.

It would thus be desirable to provide methods and camera, in which unacceptable images can quickly and easily be managed on a camera.

SUMMARY OF THE INVENTION

The invention is defined by the claims. The invention, in broader aspects, provides an image record organization method, camera, and system, in which a plurality of image records are provided and a value index is determined for each of the image records. The image records are classified into unacceptable records having respective value indexes within a predetermined threshold and acceptable records having respective value indexes beyond the threshold. The unacceptable records are demarcated from the acceptable records.

It is an advantageous effect of the invention that an improved methods and camera are provided, in which unacceptable images can quickly and easily be managed on a camera.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 2 is a table of different modifications of the method of FIG. 1 showing details of the demarcation of the unacceptable image records from the acceptable image records.

FIG. 3 shows a single iteration beginning at "Start" and ending at "Return".

DETAILED DESCRIPTION OF THE INVENTION

Figure 1:
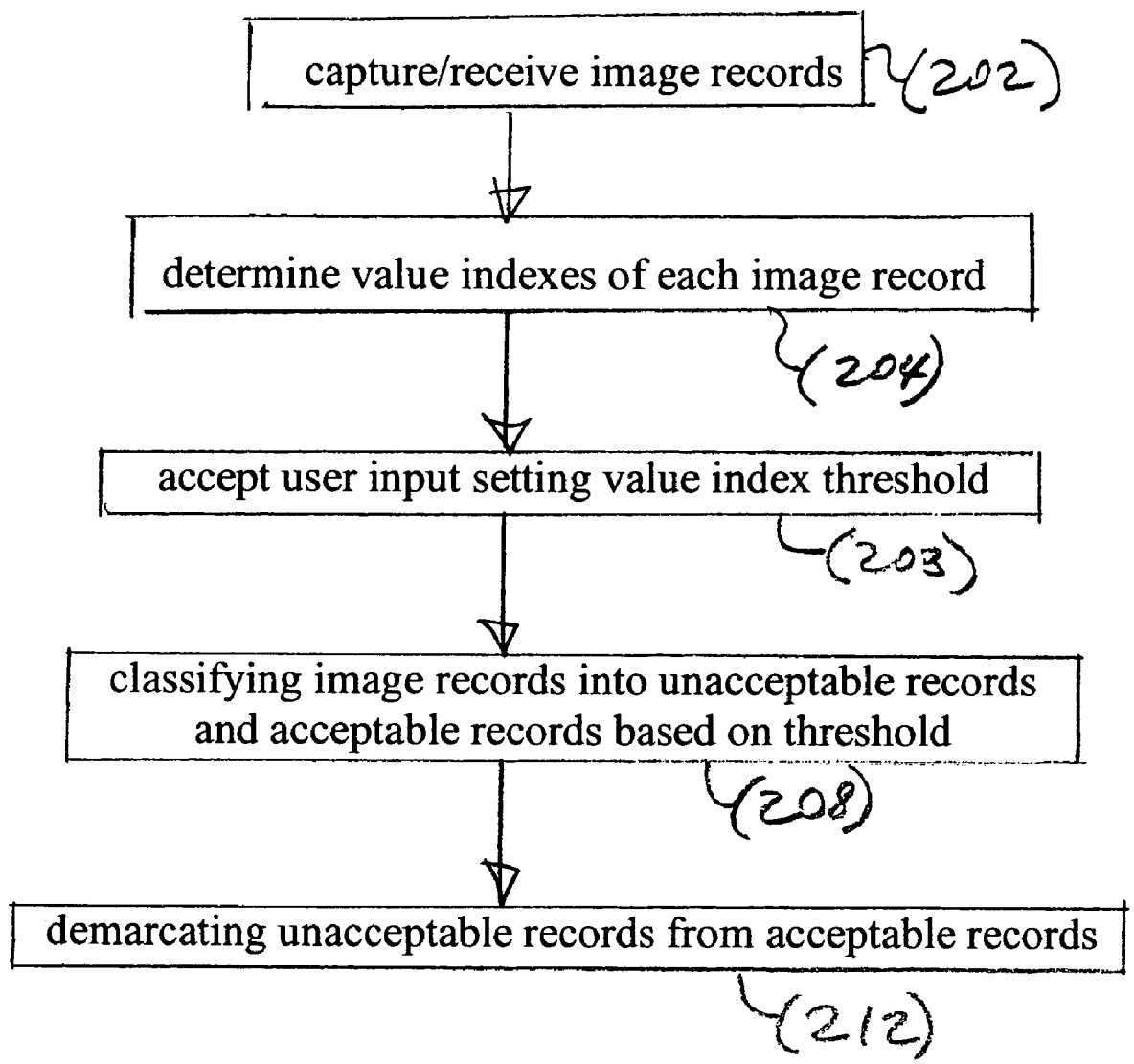
FIG. 1 is a flow diagram of an embodiment of the method.

In the image record organization method and system, a plurality of image records are provided and a value index of each of the image records is determined. The image records are classified into unacceptable records having respective value indexes within a predetermined threshold and acceptable records having respective value indexes beyond the threshold. The unacceptable image records are then demarcated from the acceptable image records. The system can be a camera.

The term "archival image" is used herein to refer to a digital image stored in memory and accessible to the user following a capture event. An archival image is distinguished from other non-archival electronic images produced during capture of a light image of a scene. Such non-archival images include earlier images in the imaging chain leading to the archival image, such as the initial analog electronic image captured by the image sensor of the camera and the initial digital image produced by digitizing the initial analog image. In those cases, the non-archival images and the resulting archival image are all produced from the same light image. Another type of non-archival images is images used in viewfinding, setting exposure and focus, and the like. These non-archival images may be shown to the user on a viewfinder or the like, but are not made available for ordinary use subsequent to capture. These non-archival images can be automatically deleted by reuse of the memory used for storing them.

The term "image record" is used here to refer to a digital still image, video sequence, or multimedia record. An image record is inclusive of one or more images in any combination with sounds or other data and is exclusive of any non-archival images. For example, image records include multiple spectrum images, scannerless range images, digital album pages, and multimedia video presentations. Discussion herein is generally directed to image records that are captured using a digital camera. Image records can also be captured using other capture devices and by using photographic film or other means and then digitizing. As discussed herein, image records are stored digitally along with associated information.

The term "date-time" is used here to refer to time related information, such as a date and a time of day; however, a date-time can be limited to a particular unit of time, such as date information without times.

In the following description, some features are described as "software" or "software programs". Those skilled in the art will recognize that the equivalent of such software can also be readily constructed in hardware. Because image manipulation algorithms and systems are well known, the present description emphasizes algorithms and features forming part of, or cooperating more directly with, the method. General features of digital still and video cameras and computerized systems are likewise well known, and the present description is generally limited to those aspects directly related to the method of the invention. Other aspects of such algorithms and apparatus, and hardware and/or software for producing and otherwise processing the image signals involved therewith, not specifically shown or described herein may be selected from such systems, algorithms, components, and elements known in the art. Given the description as set forth herein, all additional software/hardware implementation is conventional and within the ordinary skill in the art.

Figure 5:
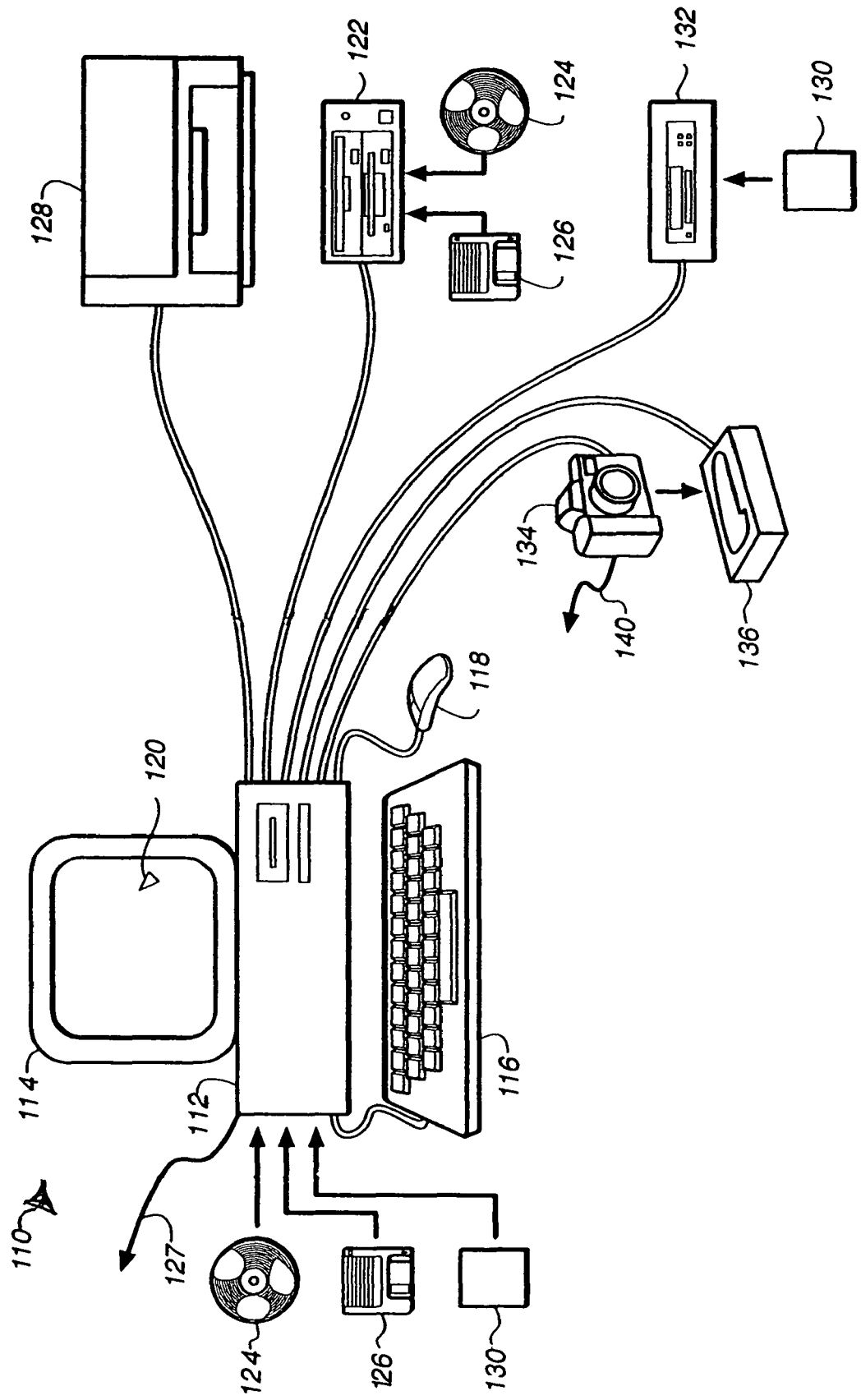
FIG. 5 is a diagrammatical view of an embodiment of the system.

The present invention can be implemented in computer hardware and computerized equipment. For example, the method can be performed using a system including one or more digital cameras or other capture devices and/or one or more personal computers. Referring to FIG. 5, there is illustrated a computer system 110 for implementing the present invention. Although the computer system 110 is shown for the purpose of illustrating a preferred embodiment, the present invention is not limited to the computer system 110 shown, but may be used with any electronic processing system such as found in digital cameras, cellular camera phones and other mobile devices, home computers, kiosks, retail or wholesale photofinishing, or any other system for the processing of digital images. The computer system 110 includes a microprocessor-based unit 112 (also referred to herein as a digital image processor) for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor-based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

Removal memory, in any form, can be included and is illustrated as a compact disk-read only memory (CD-ROM) 124, which can include software programs, is inserted into the microprocessor based unit for providing a means of inputting the software programs and other information to the microprocessor based unit 112. Multiple types of removal memory can be provided (illustrated here by a floppy disk 126) and data can be written to any suitable type of removable memory. Memory can be external and accessible using a wired or wireless connection, either directly or via a local or large area network, such as the Internet. Still further, the microprocessor-based unit 112 may be programmed, as is well known in the art, for storing the software program internally. A printer or other output device 128 can also be connected to the microprocessor-based unit 112 for printing a hardcopy of the output from the computer system 110. The microprocessor-based unit 112 can have a network connection 127, such as a telephone line or wireless link, to an external network, such as a local area network or the Internet.

Images may also be displayed on the display 114 via a memory card, such as a personal computer card (PC card) 130, such as, as it was formerly known, a PCMCIA card (based on the specifications of the Personal Computer Memory Card International Association), which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera or a scanner. Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

The output device 128 provides a final image that has been subject to transformations. The output device can be a printer or other output device that provides a paper or other hard copy final image. The output device can also be an output device that provides the final image as a digital file. The output device can also include combinations of output, such as a printed image and a digital file on a memory unit, such as a CD or DVD, which can be used in conjunction with any variety of home and portable viewing device such as a "personal media player" or "flat screen TV".

The microprocessor-based unit 112 provides means for processing the digital images to produce pleasing looking images on the intended output device or media. The present invention can be used with a variety of output devices that can include, but are not limited to, a digital photographic printer and soft copy display. The microprocessor-based unit 112 can be used to process digital images to make adjustments for overall brightness, tone scale, image structure, etc. of digital images in a manner such that a pleasing looking image is produced by an image output device. Those skilled in the art will recognize that the present invention is not limited to just these mentioned image processing functions.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non rectilinear arrays with equal effect.

The general control computer shown in FIG. 5 can store a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program can also be stored on any other physical device or medium employed to store a computer program indicated by offline memory device.

It should also be noted that the present invention can be implemented in a combination of software and/or hardware and is not limited to devices, which are physically connected and/or located within the same physical location. One or more of the devices illustrated in FIG. 5 can be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., camera, PDA or cell phone that can be used as a processing unit, a display unit, or a unit to give processing instructions), and as a service offered via the World Wide Web.

In each context, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The cameras disclosed herein have features necessary to practice the invention. Other features are well known to those of skill in the art. In the following, cameras are sometimes referred to as still cameras and video cameras. It will be understood that the respective terms are inclusive of both dedicated still and video cameras and of combination still/video cameras, as used for the respective still or video capture function. It will also be understood that the camera can include any of a wide variety of features not discussed in detail herein, such as, detachable and interchangeable lenses and multiple capture units. The camera can be portable or fixed in position and can provide one or more other functions related or unrelated to imaging. For example, the camera can be a cell phone camera or can provide communication functions in some other manner.

Figure 4:
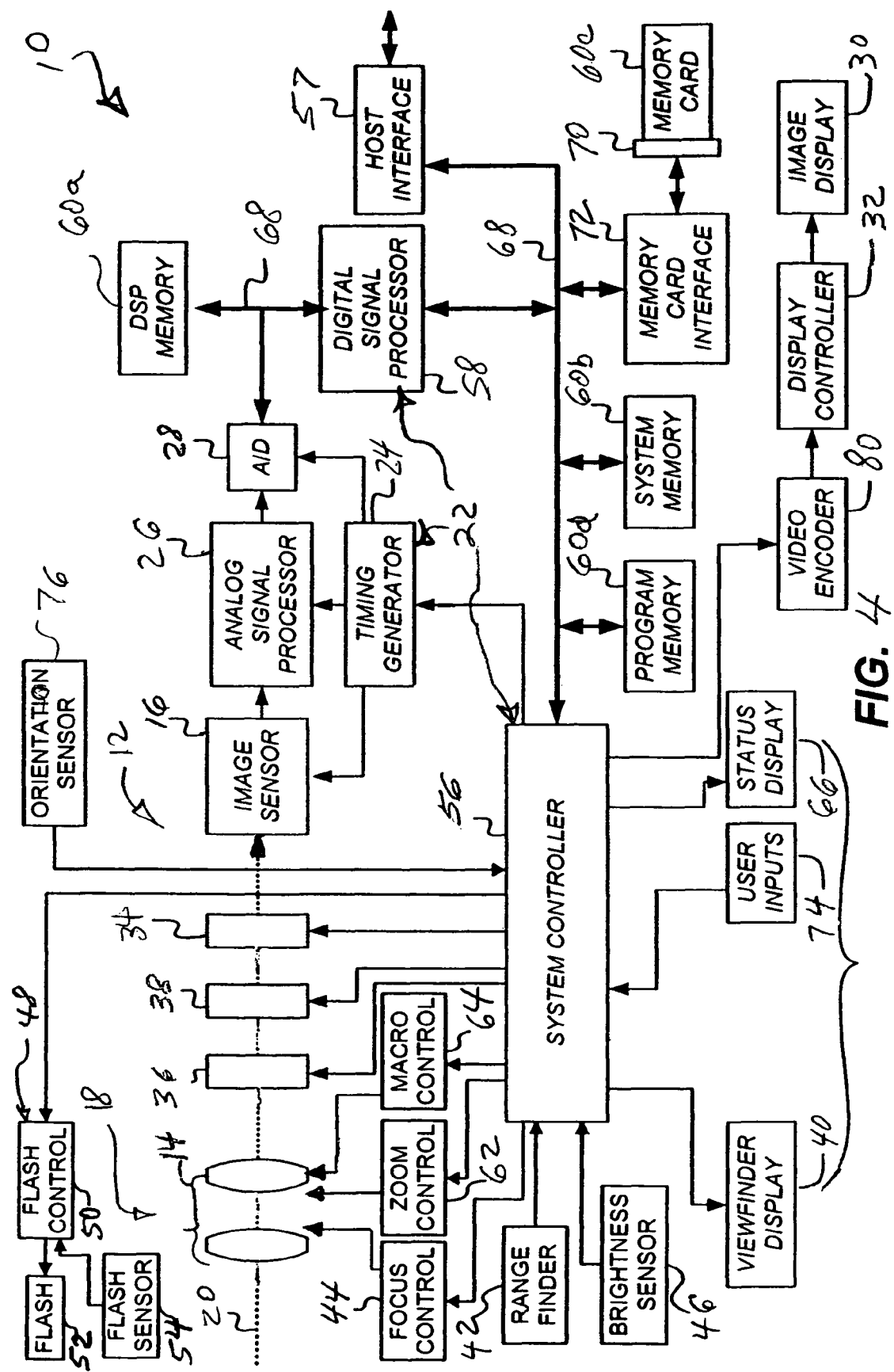
FIG. 4 is a diagrammatical view of an embodiment of the camera of the invention.
Figure 6:
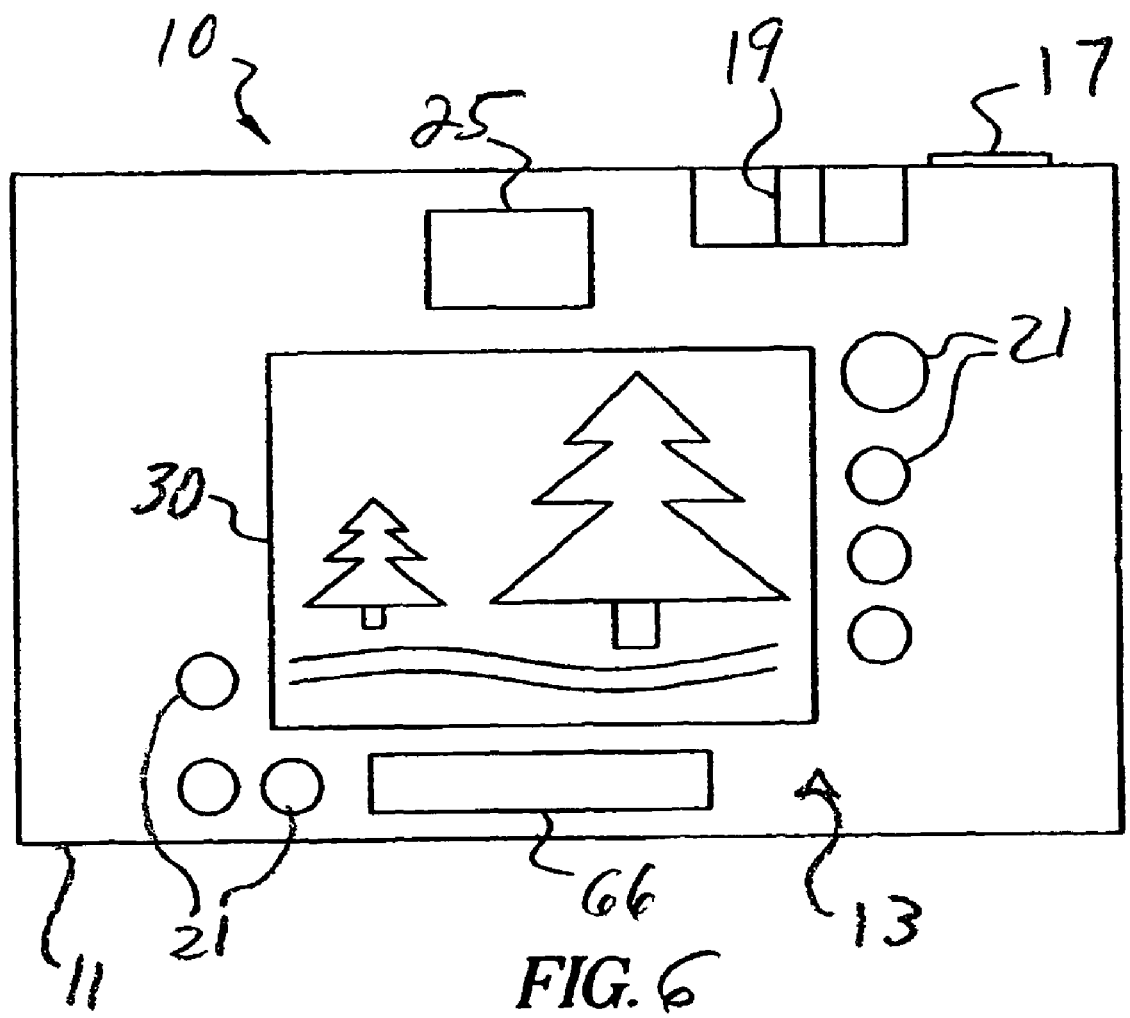
FIG. 6 is a semi-diagrammatical rear view of the camera of FIG. 4.

Referring to FIGS. 4 and 6, in a particular embodiment, the camera 10 has a body 11 that provides structural support and protection for other components. The body 11 can be varied to meet requirements of a particular use and style considerations. An electronic image capture unit 12, which is mounted in the body 11, has a taking lens 14 and an electronic array image sensor 16 aligned with the taking lens 14. The camera 10 has a user interface 13, which provides outputs to the photographer and receives photographer inputs. The user interface 13 includes one or more user input controls (labeled "user inputs" in FIG. 4) and an image display 30. User input controls can include a shutter release 17, a "zoom in/out" control 19 that controls the zooming of the lens units, and other user controls 21. User input controls can be provided in the form of a combination of buttons, rocker switches, joysticks, rotary dials, touch screens, microphones and processors employing voice recognition responsive to user initiated auditory commands, and the like. The user interface can include user reaction tracking features, such as an image sensor, a galvanic response sensor, the above-mentioned microphone. These features can store unanalyzed information for later analysis or a module capable of analyzing user responses and generating appropriate metadata can be included in the user interface. U.S. Patent Publication No. 2003/0128389 A1, filed by Matraszek et al., discusses the generation of metadata from user reaction tracking.

The user interface 13 can include one or more information displays 66 to present camera information to the photographer, such as exposure level, exposures remaining, battery state, flash state, and the like. The image display 30 can instead or additionally also be used to display non-image information, such as camera settings. For example, a graphical user interface (GUI) can be provided, including menus presenting option selections and review modes for examining captured images. Both the image display 30 and a digital viewfinder display (not illustrated) can provide the same functions and one or the other can be eliminated. The camera can include a speaker and/or microphone (not shown), to receive audio inputs and provide audio outputs.

When used as a still camera, the camera 10 assesses ambient lighting and/or other conditions and determines scene parameters, such as shutter speeds and diaphragm settings. A stream of non-archival electronic images are captured in a continuing sequence and displayed to the photographer. The capture of non-archival images ends when the shutter release or trigger 17 is tripped and an archival image is captured. In video capture mode, archival images are captured in a stream as long as the trigger is actuated or toggled on and then off. Many still digital cameras have a two-stroke shutter release. Typically, a partial depression of a shutter button actuates a switch commonly referred to as S1, and full depression of the shutter button actuates a switch commonly referred to as S2. (Full depression is also referred to as "S1-S2 stroke".) A continuous stream of non-archival images is captured at the first stroke and a single archival image is captured at the second stroke.

When the photographer trips the shutter release, light from a subject scene propagates along an optical path 20 through the taking lens 12 strikes the image sensor 16 producing an analog electronic image, which is then digitized and digitally processed. (For convenience, image capture is generally discussed herein in terms of individual still images, like considerations apply to capture of bursts of still images and video sequences.)

The type of image sensor 16 used may vary, but it is highly preferred that the image sensor be one of the several solid-state image sensors available. For example, the image sensor can be a charge-coupled device (CCD), a CMOS sensor (CMOS), or charge injection device (CID). Some components of a control unit 22 work with the image sensor 16. In the illustrated camera, those components are a clock driver (also referred to herein as a timing generator) 24, analog signal processor 26 and an analog-to-digital converter/amplifier (A/D) 28. Such components can also be incorporated in a single unit with the image sensor. For example, CMOS image sensors are manufactured with a process that allows other components to be integrated onto the same semiconductor die.

The electronic image capture unit 16 captures an image with three or more color channels. It is currently preferred that a single image sensor 16 be used along with a color filter, however, multiple monochromatic image sensors and filters can be used. Suitable filters are well known to those of skill in the art, and, in some cases are incorporated with the image sensor 16 to provide an integral component. Those skilled in the art will recognize that some procedures described herein in relation to digital images having multiple color channels can also be limited to one or more of the channels, but less than all of the channels. Suitability of this approach can be determined heuristically.

The image display 30 is driven by an image display driver or controller 32 and produces a light image (also referred to here as a "display image") that is viewed by the user. Different types of image display 30 can be used. For example, the image display can be a liquid crystal display ("LCD"), a cathode ray tube display, or an organic electroluminescent display ("OELD"; also referred to as an organic light emitting display, "OLED"). The display 30 can be mounted on the back or top of the body, so as to be readily viewable by the photographer immediately following a picture taking.

The electrical signal from each pixel of the image sensor 16 is related to both the intensity of the light reaching the pixel and the length of time the pixel is allowed to accumulate or integrate the signal from incoming light. This time is called the integration time or exposure time. Integration time is controlled by a shutter 34, that is switchable between an open state and a closed state. The shutter 34 can be mechanical or electromechanical or can be provided as a logical function of the hardware and software of the electronic image capture unit. For example, some types of image sensors 16 allow the integration time to be controlled electronically by resetting the image sensor and then reading out the image sensor some time later. When using a CCD, electronic control of the integration time of the image sensor 16 can be provided by shifting the accumulated charge under a light shielded register provided at a non-photosensitive region. This can be a full frame as in a frame transfer device CCD or a horizontal line in an interline transfer device CCD. Suitable devices and procedures are well known to those of skill in the art. Thus, the timing generator 24 can provide a way to control when the image sensor is actively recording the image. In the camera of FIG. 1, the shutter 34 and the timing generator 24 jointly determine the integration time.

The combination of overall light intensity and integration time is called exposure. Equivalent exposures can be achieved by various combinations of light intensity and integration time. Although the exposures are equivalent, a particular exposure combination of light intensity and integration time may be preferred over other equivalent exposures for capturing a given scene image. Although FIG. 4 shows several exposure controlling elements, some embodiments may not include one or more of these elements, or there may be alternative mechanisms of controlling exposure. The camera can have alternative features to those illustrated. For example, shutters are well-known to those of skill in the art, that also function as diaphragms.

In the illustrated camera, a filter assembly 36 and diaphragm 38 modify the light intensity at the sensor 16. Each is adjustable. The diaphragm 38 controls the intensity of light reaching the image sensor 16 using a mechanical aperture (not shown) to block light in the optical path. The size of the aperture can be continuously adjustable, stepped, or otherwise varied. As an alternative, the diaphragm 38 can be emplaceable in and removable from the optical path 20. Filter assembly 36 can be varied likewise. For example, filter assembly 36 can include a set of different neutral density filters (not shown) that can be rotated or otherwise moved into the optical path 20.

Referring again to FIG. 4, the camera 10 has a optical system 18 that includes the taking lens 14 and can also include components (not shown) of a viewfinder 25. The optical system 18 can take many different forms. For example, the taking lens 14 can be fully separate from an optical viewfinder or from a digital viewfinder that has an eyepiece (not shown) over an internal viewfinder display 40. The viewfinder and taking lens can also share one or more components. Details of these and other alternative optical systems are well known to those of skill in the art. For convenience, the optical system is generally discussed hereafter in relation to an embodiment having a digital viewfinder including viewfinder display 40 and a separate on-camera display 30 that can be also be used to view a scene, as is commonly done with digital cameras.

The taking lens 14 can be simple, such as having a single focal length and manual focusing or a fixed focus, but this is not preferred. In the camera shown in FIG. 4, the taking lens unit 12 is a motorized zoom lens in which a mobile element or elements are driven, relative to one or more other lens elements, by a zoom drive. This allows the effective focal length of the lens to be changed. Digital zooming (digital enlargement of a digital image) can also be used instead of or in combination with optical zooming. The taking lens can also include elements or groups (not shown) that can be inserted or removed from the optical path, such as to provide a macro (close focus) capability.

The taking lens 14 of the camera is also preferably autofocusing. For example, an autofocusing system can provide focusing using passive or active autofocus or a combination of the two. Referring to FIG. 4, an autofocusing system has a rangefinder 42 that sends a signal to the control unit 22 to provide a distance range or ranges for an imaged scene. The control unit 22 does a focus analysis of the signal and then operates a focus driver or control 44 to move the focusable element or elements (not separately illustrated) of the taking lens 14. The functions of the rangefinder 42 can alternatively be provided as software and hardware functions of the capture unit 12.

The camera 10 includes a brightness sensor 46. In FIG. 4, the brightness sensor can be provided, as shown in the form of one or more discrete components. The brightness sensor 46 has a driver (not shown) that operates a single sensor or multiple sensors and provides a signal representing scene light intensity to the control unit 40 for use in the analysis of exposure of the scene. As an option, this signal can also provide color balance information. An example, of a suitable brightness sensor that can be used to provide one or both of scene illumination and color value and is separate from the electronic image capture unit 16, is disclosed in U.S. Pat. No. 4,887,121. The brightness sensor can also be provided as a logical function of hardware and software of the capture unit.

The camera of FIG. 4 includes a flash unit 48 having a flash unit controller 50 (labeled "flash control" in FIG. 4), which has an electronically controlled illuminator 52 (labeled "flash" in FIG. 4) such as a xenon flash tube. A flash sensor 52 can optionally be provided, which outputs a signal responsive to the light sensed from the scene during archival image capture or by means of a preflash prior to archival image capture. The flash sensor signal is used in controlling the output of the flash unit 48 by means of the dedicated flash unit controller 50. As an alternative, the flash unit controller 50 can be eliminated and flash control can be provided as a function of the control unit 22. Flash output can also be fixed or varied based upon other information, such as focus distance. The function of flash sensor 54 and brightness sensor 46 can be combined in a single component or provided as a logical function of the capture unit 12 and control unit 22.

The control unit 22 controls or adjusts the exposure regulating elements and other camera components, facilitates transfer of images and other signals, and performs processing related to the images. The control unit 22 shown in FIG. 4, includes a system controller 56, timing generator 24, analog signal processor 26, A/D converter 28, digital signal processor 58, and memory 60a-60d. Suitable components for the control unit 22 are known to those of skill in the art. These components can be provided as enumerated or by a single physical device or by a larger number of separate components. The system controller 56 can take the form of an appropriately configured microcomputer, such as an embedded microprocessor having RAM for data manipulation and general program execution. Modifications of the control unit 22 are practical, such as those described elsewhere herein.

The timing generator 24 supplies control signals for all electronic components in timing relationship. Calibration values for the individual camera 10 are stored in a calibration memory (not separately illustrated), such as an EEPROM, and supplied to the system controller 56. The components of the user interface are connected to a control unit 22 and function by means of a combination of software programs executed on the system controller 56. The control unit 22 also operates the other components, including drivers and memories, such as the zoom control 62, focus control 44, macro control 64, display drivers 32, and other drivers (not shown) for the shutter 34, diaphragm 36, filter assembly 38, and viewfinder and status displays 40,66.

The camera 10 can include other components to provide information supplemental to captured image information. An example of such a component 76 is the orientation sensor illustrated in FIG. 4. Other examples include a real time clock, a global positioning system receiver, and a keypad or other entry device for entry of user captions or other information.

It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein may be conveniently combined or shared. Multiple components can be provided in distributed locations.

The captured electronic image from the image sensor is amplified, processed, and converted from analog to digital by the analog signal processor 26 and A/D converter 28. The resulting digital electronic image is then processed in the digital signal processor 58, using DSP memory 60a and following processing, is stored in system memory 60b and/or removable memory 60c. Signal lines, illustrated as a data bus 68, electronically connect the image sensor 16, system controller 56, processor 58, image display 30, memory 60a-60d, and other electronic components; and provide a pathway for address and data signals.

"Memory" refers to one or more suitably sized logical units of physical memory provided in semiconductor memory or magnetic memory, or the like. Memory 60a-60d can each be any type of random access memory. For example, memory can be an internal memory, such as, such as SDRAM or Flash EPROM memory, or alternately a removable memory, or a combination of both. Removable memory 60c can be provided for archival image storage. Removable memory can be of any type, such as a Compact Flash (CF) or Secure Digital (SD) type card inserted into a socket 70 and connected to the system controller 56 via memory card interface 72. Other types of storage that are utilized include without limitation PC-Cards, MultiMedia Cards (MMC), or embedded and/or removable Hard Drives.

The system controller 56 and digital signal processor 58 can be controlled by software stored in the same physical memory that is used for image storage, but it is preferred that the system controller 56 and digital signal processor 58 are controlled by firmware stored in dedicated memory 60d, for example, in a ROM or EPROM firmware memory. Separate dedicated units of memory can also be provided to support other functions. The memory on which captured images are stored can be fixed in the camera 10 or removable or a combination of both. The type of memory used and the manner of information storage, such as optical or magnetic or electronic, is not critical. For example, removable memory can be a floppy disc, a CD, a DVD, a tape cassette, or flash memory card or stick. The removable memory can be utilized for transfer of image records to and from the camera in digital form or those image records can be transmitted as electronic signals.

The illustrated camera has multiple processors. Although this partitioning of camera functional control among multiple controllers and processors is typical, these controllers or processors are combined in various ways without affecting the functional operation of the camera. These controllers or processors can comprise one or more digital signal processor devices, microcontrollers, programmable logic devices, or other digital logic circuits. Although a combination of such controllers or processors has been described, it should be apparent that one controller or processor can perform all of the needed functions. All of these variations can perform the same function.

In the illustrated embodiment, digital signal processor 58 manipulates the digital image data in its memory 60*a* according to a software program permanently stored in program memory 60*d* and copied to memory 60*a* for execution during image capture. Digital signal processor 58 executes the software necessary for practicing image processing. The digital image can also be modified in the same manner as in other digital cameras to enhance images. For example, the image can be processed by the digital signal processor to provide interpolation and edge enhancement. The digital processing can provide images with modifications for use as display images on the displays on the camera and archival images with modifications for storage in a particular file structure. For example, to be displayed an image may need to be transformed to accommodate different capabilities in terms of gray scale, color gamut, and white point of the display and the imager and other components of the electronic capture unit. The displayed image may be cropped, reduced in resolution and/or contrast levels, or some other part of the information in the image may not be shown. Modifications related to file transfer, can include operations such as, JPEG compression and file formatting. Enhancements can also be provided in both cases. The image modifications can also include the addition of metadata, that is, image record associated non-image information.

System controller 56 controls the overall operation of the camera based on a software program stored in program memory 60*d*, which can include Flash EEPROM or other nonvolatile memory. This memory 60*d* can also be used to store image sensor calibration data, user setting selections and other data which must be preserved when the camera is turned off. System controller 56 controls the sequence of image capture by directing the macro control 64, flash control 50, focus control 44, and other drivers of capture unit components as previously described, directing the timing generator 24 to operate the image sensor 16 and associated elements, and directing digital signal processor 58 to process the captured image data. After an image is captured and processed, the final image file stored in system memory 60*b* or digital signal processor memory 60*a*, is transferred to a host computer (not illustrated in FIG. 4) via interface 57, stored on a removable memory card 60*c* or other storage device, and displayed for the user on image display 30. Host interface 57 provides a high-speed connection to a personal computer or other host computer for transfer of image data for display, storage, manipulation or printing. This interface can be an IEEE1394 or USB2.0 serial interface or any other suitable digital interface. The transfer of images, in the method, in digital form can be on physical media or as a transmitted electronic signal.

In the illustrated camera 10, processed images are copied to a display buffer in system memory 60*b* and continuously read out via video encoder 80 to produce a video signal. This signal is processed by display controller 32 and/or digital signal processor 58 and presented on image display 30 and can be output directly from the camera for display on an external monitor. The video images are archival in the camera is used for video capture and non-archival if used for viewfinding prior to still archival image capture.

The method and apparatus herein can include features provided by software and/or hardware components that utilize various data detection and reduction techniques, such as face detection, skin detection, people detection, other object detection, essential for interpreting the scene depicted on an image, for example, a birthday cake for birthday party pictures, or characterizing the image, such as in the case of medical images capturing specific body parts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

Figure 3:
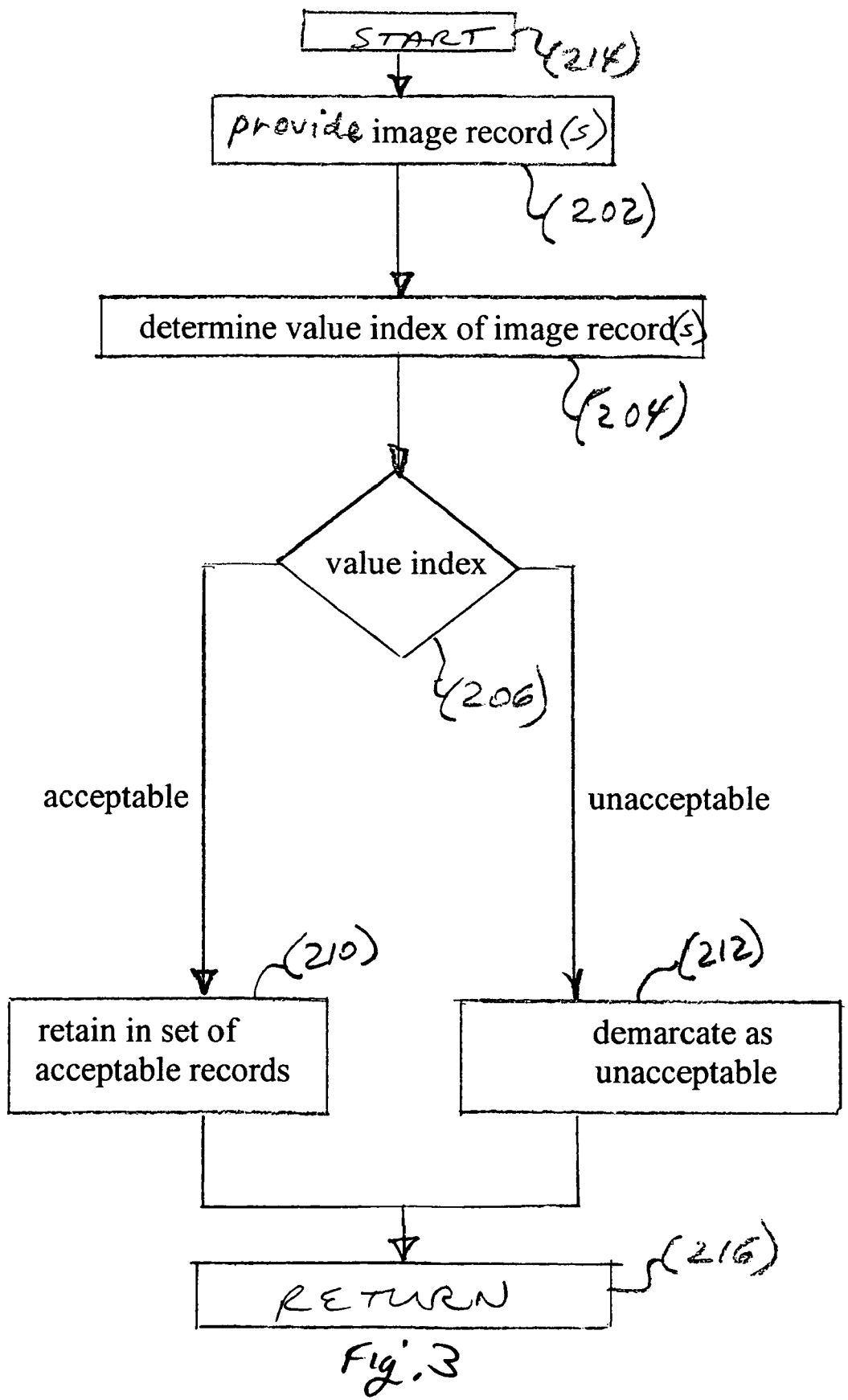
FIG. 3 is a detailed partial flow diagram of one of the modifications of FIG. 2, in which steps, in accordance with FIG. 1, are provided iteratively.

Referring now to FIGS. 1-3, image records are provided (202) either by capture or by receipt of earlier created images. A value index threshold is also provided, for example by accepting (203) a user input of a value of the threshold. A value index is determined (204) for each image record. This determining is inclusive of generating the value index for each image record or detecting pre-existing value indexes or a combination of both for different image records. The value index is compared (206) to the predetermined threshold for minimum value. If the value index of the image record is within the threshold, then the image record is classified (208) as unacceptable. If the value index of the image record is beyond the threshold, then the image record is classified (208) as acceptable. Acceptable image records are retained (210) in a set. Unacceptable image records are demarcated (212) from the acceptable image records. The method can process a group of image records together in one batch or can process a collection of image records individually or in groups by applying the method iteratively. FIG. 3 shows a single iteration beginning at box 214 labeled "Start" and ending at box 216 labeled "Return". At Return, the steps are looped back to Start for the next interation with another image record or group or the process ends. The method is particularly suitable for use in a camera and the following discussion is generally directed to such a camera. It will be understood that like considerations apply to other embodiments.

The image records can be provided by retrieval from memory, capture, transfer from another source, or any combination of these. For example, the image records can be provided by wireless transmission to a camera in the form of a camera phone.

The demarcation of the unacceptable image records can be physical or logical or both and can be reversible or irreversible. In demarcating, the unacceptable image records can be isolated or separated or can be marked to delimit them from acceptable image records. For example, in the demarcating, the unacceptable image records can be grouped in a different logical folder than the acceptable image records. Similarly, the unacceptable image records can be marked with a digital file attribute or other logical tag that makes the unacceptable image records different than the acceptable image records. Likewise, the unacceptable files can be demarcated by identifying them in a look-up table.

The demarcating of the unacceptable image records can include discarding the unacceptable image records. This discarding can be reversible or irreversible. Reversible discarding is a change in digital file marking that alters available access, but does not destroy the image information. For example, unacceptable image records can be deleted in a conventional manner, that is filenames of unacceptable image records can be changed to remove the unacceptable image records from directories of saved image records and queue the unacceptable image records for overwriting as space is needed. In this case, the discarding can be reversed by use of recovery procedures appropriate to the particular system, before the discarded records have been overwritten. Alternatively, the unacceptable image records can be immediately overwritten or otherwise destroyed without possibility of recovery.

The demarcating can include blocking fulfillment of the unacceptable images. The term "fulfillment" is used herein to describe further use of an archival image following capture. For example, fulfillment can include any one or more of: long term archival storage, transmission to another site, image processing, queuing of the image records for viewing or other purpose, non-image processing computations, hard copy output, soft copy display, and non-image output, organizing, labeling, aggregation with other information, and other allocating of resources to individual image records.

Fulfillment can alternatively be provided differently for unacceptable and acceptable image records. For example, unacceptable image records could be stored at a higher compression ratio than acceptable image records. Similarly, unacceptable image records could be automatically retained in memory for a shorter time than acceptable records.

Demarcating can be completely free of user intervention or can include user intervention as a necessary or optional step. For example, indications of unacceptable image records can be displayed and user input confirming or abnegating the indicated status can be accepted. The indications can take a variety of forms, such as the image records, thumbnails, keyframes, filenames or the like. The user can be given the opportunity to discard or retain unacceptable image records. The user can be given the same choice as to one or more fulfillment procedures. For example, the user can be required to confirm discarding of image records found by the camera or other system to be unacceptable. As another example, the user can be required to confirm exclusion of unacceptable image records from transmittal to remote storage with acceptable image records. User input can also be allowed to selectively change the status of individual image records from unacceptable to acceptable, to confirm an indicated further treatment of particular image records, to otherwise decide about an indicated action, to set defaults, and the like.

The method can be performed on each image record, before a next image record is provided or can be performed on a batch of images or even on a completed database. In particular embodiments, the demarcating of unacceptable images is intermittent with capturing, either following capture of each image record or following capture of a small number of image records, such as a burst of still images. This has the advantage of reducing on-going storage requirements and, if user confirmation is required, of limiting the number of image records on which a decision is required, to one or a relatively small number.

In a particular embodiment, the system accepts user input that sets the value index threshold used in the method. This allows the user to adjust the boundary between unacceptable and acceptable image records. This adjustment can be made precise, within the limits of the value index used, or coarse. The latter approach has the advantage that differences in adjustments are more likely to be readily apparent to the user.

It is possible for a user to enter a value index for each captured image in a camera or collection of images, but this is inconvenient and likely to be undesirable for most users. It is highly preferred that the value indexes of the image records be generated without user intervention. A variety of value indexes of image records are known to those of skill in the art. A currently preferred value index is computed automatically from one or more of: user inputs to the camera used during capture of the respective image record, image quality of the respective image record, image content of the respective image record, and user reactions to the respective image record.

It is currently preferred that the value index is determined by a procedure that allows usage of incomplete information. An incomplete information value index having this feature is disclosed in cofiled U.S. patent application Ser. No. 11/403,686, entitled "VALUE INDEX FROM INCOMPLETE DATA". This approach has the advantage that a value index can be calculated in a camera with some information and, if desired, that value index can be recalculated later using later acquired information. Other value indexes can be used instead, such as those disclosed in the V-550 digital camera, marketed by Eastman Kodak Company of Rochester, N.Y., (the camera includes a user control labeled "Share", which can be actuated by the user to designate a respective image for preferential printing and e-mailing); U.S. Patent Publication No. 2003/0128389 A1, filed by Matraszek et al.; U.S. Pat. No. 6,671,405 to Savakis et al.; and U.S. Patent Publication No. 2004/0075743.

In determining the above-mentioned incomplete information value index, the image records are collected and sets of image data are provided. (The term "image data" as used herein referred to information exclusive of the image or images of an associated image record.) Each set is associated with a respective image record. Each set includes data in one or more (or all) of the categories: capture related data, image analysis data, image usage data, and user reaction data. The data sets of a plurality of the image records can be incomplete and the missing data can be in different combinations of categories in different image records. For example, one image record can lack image analysis data and another image usage data. A value index of each of the image records is generated using the respective set of information data. The generating is statistically independent of any of the categories having missing data in the respective set. In other words, the generating does not treat missing information as having a default or zero value, but rather generates the respective value index without consideration of the category for which information is unavailable. As a result, the value indexes of the collection of image records are, in effect, calculated using different algorithms. This approach has the advantage that missing data in a particular category does not preclude generation and use of a value index.

Capture related data is data available at the time of capture that defines capture conditions, such as exposure, location, date-time, status of camera functions, and the like. This is information that cannot be derived from the image record itself. Examples of capture related data includes: lens focal length, shutter speed, lens aperture, exposure time, digital/optical zoom status, flash fired state, detected subject distance, image size, location information, and time of capture. Capture related data relates to both set up and capture of an image record and can also relate to on-camera review of the image record.

Capture related data can be derived from user inputs to a camera or other capture device. Each user input provides a signal to the control unit of the camera, which defines an operational setting. For example with a particular camera, the user moves an on-off switch to power on the camera. This action places the camera in a default state with a predefined priority mode, flash status, zoom position, and the like. Similarly, when the user provides a partial shutter button depression, autoexposure and autofocus engage, a sequence of viewfinder images begins to be captured and automatic flash set-up occurs.

The user enters inputs using a plurality of camera user controls that are operatively connected to a capture unit via a control unit. The user controls include user capture controls that provide inputs that set-up the camera for capture. Examples are a capture mode switch and flash status control. The user controls can also include user viewfinder-display controls that operate a viewfinder-display unit for on-camera review of an image or images following capture. Examples of user inputs include: partial shutter button depression, full shutter button depression, focal length selection, camera display actuation, selection of editing parameters, user classification of an image record, and camera display deactivation. The viewfinder-display controls can include one or more user controls for manual user classification of images, for example, a "share" or "favorite" button.

The inputs for a particular image record can be limited to those received during composition, capture, and, optionally, during viewing of that image record. Alternatively, one or more inputs concurrent with composition, capture, and, optionally, viewing of one or more other image records can also be included. For example, if several images are taken of the same scene or with slight shifts in scene (for example as determined by a subject tracking autofocus system and the recorded time/date of each image), then information datas related to all of the images could be used in deriving the capture related data of each of the images.

Another example of capture related data is temporal values calculated from temporal relationships between two or more of the camera inputs. Temporal relationships can be elapsed times between two inputs or events occurring within a particular span of time. Examples are inputs defining one or more of: image composition time, S1-S2 stroke time, on-camera editing time, on-camera viewing time, and elapsed time at a particular location (determined by a global positioning system receiver in the camera or the like) with the camera in a power on state. Temporal relationships can be selected so as to all exemplify additional effort on the part of the user to capture a particular image or sequence of images. Geographic relationships between two or more inputs can yield information datas in the same manner as temporal relationships as can combinations of different kinds of relationships, such as inputs within a particular time span and geographic range.

Other examples of capture related image data include information derived from textual or vocal annotation that is retained with the image record, location information, current date-time, photographer identity. Such data can be entered by the user or automatically. Annotations can be provided individually by a user or can be generated from information content or preset information. For example, a camera can automatically generate the caption "Home" at a selected geographic location or a user can add the same caption. Suitable hardware and software for determining location information, such as Global Positioning System units are well known to those of skill in the art. Photographer identity can be determined by such means as: use of an identifying transponder, such as a radio frequency identification device, user entry of identification data, voice recognition, or biometric identification, such as user's facial recognition or fingerprint matching. Combinations of such metadata and other parameters can be used to provide image data. For example, date-time information can be used in combination with prerecorded identifications of holidays, birthdays, or the like.

Capture related data can be saved at the time of capture as individual items of metadata. In some cases, the capture related data can be in the form of metadata commonly saved with captured images and made available for image organization, such as annotations and date-time information. Other items of capture related data discussed here, such as S1-S2 stroke time are unlikely to be utilized for image organization.

Intrinsic image data is derived from an analysis of the image record itself. Specific types of intrinsic image data include image quality data and image content data. The former is concerned with features of an image record unrelated to content, but related to limitations in the capture of an original scene. Examples of image quality data include: image sharpness, image noise, contrast, presence/absence of dark background, scene balance, skin tone color, saturation, clipping, aliasing, and compression state. Examples of image content data include: presence/absence of people, number of people, gender of people, age of people, redeye, eye blink, smile expression, head size, translation problem, subject centrality, scene location, scenery type, and scene uniqueness. ("Translation problem" is defined as an incomplete representation of the main object in a scene, such as a face, or a body of the person.) For example, sunsets can be determined by an analysis of overall image color, as in U.S. Published Patent Application No. US20050147298 A1, filed by A. Gallagher et al., and portraits can be determined by face detection software, such as U.S. Published Patent Application US20040179719 A1, filed by S. Chen. The analysis of "image content", as the term is used here, is inclusive of image composition.

Image quality data can be preset to increase or decrease respective value indexes by predetermined amounts for specific quality factors. For example, a low sharpness value can decrease a respective value index by a predetermined percentage. Similarly, analysis results showing particular content or particular combinations of content and quality factors can be preassigned specific modifications of the respective value indexes. For example, the presence of one or more faces could raise a value index by a predetermined percentage. In the simplified example earlier discussed, in which each input is assigned one point, the presence of a face can add another point to a value index.

Image usage data is data relating to usage of a particular image record following capture. This data can reflect the usage itself or steps preparatory to that usage, for example, editing time prior to storage or printing of a revised image. Examples of image usage data include: editing time, viewing time, number of reviews, number of hard copies made, number of soft copies made, number of e-mails including a copy or link to the respective image record, number of recipients, usage in an album, usage in a website, usage as a screensaver, renaming, annotation, archival state, and other fulfillment usage. Examples of utilization on which the image usage data is based include: copying, storage, organizing, labeling, aggregation with other information, image processing, non-image processing computations, hard copy output, soft copy display, and non-image output. Equipment and techniques suitable for image record utilization are well known to those of skill in the art. For example, a database unit that is part of a personal computer can provide output via a display or a printer. In addition to direct usage information, usage data can include data directly comparable to the temporal values earlier discussed. For example, the time viewing and editing specific image records can be considered.

User reaction data is based upon observation of the reactions of the user to a respective image record. U.S. Patent Publication No. 2003/0128389 A1, to Matraszek et al., which is hereby incorporated herein by reference, discloses techniques for detecting user reactions to images. (For purposes herein, "user reactions" are exclusive of image usage and of the above-discussed inputs used for camera control.) Examples of user reactions include: vocalizations during viewing, facial expression during viewing, physiological responses, gaze information, and neurophysiological responses. User reactions can be automatically monitored via a biometric device such as a GSR (galvanic skin response) or heart rate monitor. These devices have become low cost and readily available and incorporated into image capture and display device as described in Matraszek et al.

Image data in each category can also include data derived from other image data. Examples of derived information include: compatibility of image data with a pre-established user profile, and a difference or similarity of image content to one or more reference images determined to have a high or low value index. For example, clustering as disclosed in U.S. Published Patent Application No. US2005/0105775 A1 or U.S. Pat. No. 6,993,180 can be used. Results of the event clustering can be used as capture related data.

The available data for each image record is used to generate the value index for that image record. Since the value indexes are used to compare the image records, the algorithm used must always produce a value of the same metric, despite data that is incomplete and different for different image records. This can be achieved by expressing each value index as a probability relative to a maximum for the types of data used in calculating that particular value index. Another alternative is simply calculating a total of predetermined values of each data item for a particular value index. This approach assumes that the larger the total the greater the actual value to the user. Negative values can be established for particular data items and different weights can be preassigned to different items or types of data. For example, each item of capture related data can be assigned a value of one and each item of usage data can be assigned a value of two. It is currently preferred that the value index is one-dimensional, since this allows simpler comparisons between image records.

In a particular embodiment, the set of image data is supplied to a reasoning engine that has been trained to generate value indexes. In the reasoning engine, different image data, identified by respective inputs, can compete or reinforce each other according to knowledge derived from the results of the ground truth study of human observers-evaluations of real images. Competition and reinforcement are resolved by the inference network of the reasoning engine. A currently preferred reasoning engine is a Bayes net.

A Bayes net (see, e.g., J. Pearl, *Probabilistic Reasoning in Intelligent Systems*, San Francisco, Calif.: Morgan Kaufmann, 1988) is a directed acyclic graph that represents causality relationships between various entities in the graph, where the direction of links represents causality relationships between various entities in the graph, and where the direction of links represents causality. Evaluation is based on knowledge of the Joint Probability Distribution Function (PDF) among various entities. The Bayes net advantages include explicit uncertainty characterization, efficient computation, easy construction and maintenance, quick training, and fast adaptation to changes in the network structure and its parameters. A Bayes net consists of four components:

(1) Priors: The initial beliefs about various nodes in the Bayes net.
(2) Conditional Probability Matrices (CPMs): Expert knowledge about the relationship between two connected nodes in the Bayes net.
(3) Evidences: Observations from feature detectors that are input to the Bayes net.
(4) Posteriors: The final computed beliefs after the evidences have been propagated through the Bayes net.

The most important component for training is the set of CPMs, because they represent domain knowledge for the particular application at hand. While the derivation of CPMs is familiar to a person skilled in using reasoning engines such as a Bayes net, the derivation of an exemplary CPM will be considered later in this description.

There is one Bayes net active for each image record. It is expected that a simple two-level Bayes net can be used in the current system, where the value index is determined at the root node and all the items of image data are at the leaf nodes. It should be noted that each link is assumed to be conditionally independent of other links at the same level, which results in convenient training of the entire net by training each link separately, i.e., deriving the CPM for a given link independent of others. This assumption is often violated in practice; however, the independence simplification makes implementation simpler and some inaccuracy can be tolerated. It also provides a baseline for comparison with other classifiers or reasoning engines, such as a Bayes net with more than two levels.

All the items of information data are integrated by a Bayes net to yield the value index. On one hand, different items of information data may compete with or contradict each other. On the other hand, different items of information data may mutually reinforce each other according to prior models or knowledge of typical photographic scenes. Both competition and reinforcement are resolved by the Bayes net-based inference engine.

One advantage of Bayes nets is each link is assumed to be independent of links at the same level. Therefore, it is convenient for training the entire net by training each link separately. In general, two methods are used for obtaining CPM for each root-feature node pair:

(1) Using Expert Knowledge
This is an ad-hoc method. An expert is consulted to obtain the conditional probabilities of each feature detector producing a high or low output given a highly appealing image.
(2) Using Contingency Tables
This is a sampling and correlation method. Multiple observations of each feature detector are recorded along with information about the emphasis or appeal. These observations are then compiled together to create contingency tables which, when normalized, can then be used. This method is similar to neural network type of training (learning).

Other reasoning engines may be employed in place of the Bayes net. For example, in Pattern Recognition and Neural Networks by B. D. Ripley (Cambridge University Press, 1996), a variety of different classifiers are described that can be used to solve pattern recognition problems, where having the right feature is normally the most important consideration. Such classifiers include linear discriminant analysis methods, flexible discriminants, (feed-forward) neural networks, non-parametric methods, tree-structured classifiers, and belief networks (such as Bayesian networks). It will be obvious to anyone of ordinary skill in such methods that any of these classifiers can be adopted as the reasoning engine for practice of the present invention.

The value index of an image record can be calculated at any time after capture of the image record and can be recalculated at any time after additional image data becomes available. At all of these times, the archival image record is stored in memory and an indication of the value index can be associated with the image record. The indication can be recorded in metadata in a digital image file or one of a set of digital image files. The indication can also be stored in a separate file, or within an image of the image record either visibly or by steganographic embedment or the like.

The indication can be in the form of the set of information data, the value index, or both. The selection of the particular form is a matter of convenience in a particular use. The value index can be stored as calculated (also referred to here as the "calculated index") or in an alternative form, for example, compressed by Huffman coding. In the following, the value index is generally discussed in the form of a saved set of information data that is stored within the digital file of a respective image record, like considerations apply to other variations.

The indication of the value index can be associated with an image record in the same manner as other metadata. For example, such indication can be associated with an image record by storing the value index within a digital image file. This is particularly convenient, if the image record is limited to a single digital file, since this deters accident dissociation of the value index from the image record. A particular example of metadata within an image file is a TIFF IFD within an Exif image file. Alternatively, value indexes can be stored separately. Other metadata associated with the image records can be handled in the same manner. Security and access permissions information can be included to control access to the information.

After capture, the image records can be stored as a database and can be retained in or transferred to a database unit that allows access to the image records and respective value indexes. The database unit can be internal to the camera or can be separate. The database unit can also be in the form of multiple separated components linked directly or via a network. Suitable hardware, software, file formats, compression/decompression schemes, and other criteria for storing and accessing image records and metadata are well known to those of skill in the art. In a particular embodiment, the database unit is external to the camera and is addressable independent of the camera. As the stored image records are utilized for one or more purposes, usage parameters of the individual image records are tracked, and the value indexes of the image records are revised responsive to the respective utilization. Value indexes are likewise revised when other data, such as user reaction data becomes available.

Value indexes can be revised by means of a full recalculation, if information data available or can be revised by modification of the existing value index. In a continuation of an earlier-discussed simplified example, each utilization of an image record can be assigned a value of one and can be added to the preexisting value index. Similarly, the value index of an image record could be raised by a uniform increment at the time of any utilization, and could be lowered by a likewise uniform, negative increment at each passage of a preset time period without utilization.

In the above procedure, each value index provides the intrinsic value of a particular image. The value index can alternatively provide a value relative to other images in a collection. The former approach can be particularly advantageous if image records are expected to be moved between different databases or different databases are likely to be combined or split in an unpredictable manner. In that case, repeated recalculation of value indexes can be avoided. The latter approach can be advantageous if single database is likely to be used and there is a need for repeated comparisons of the image records in the database. For example, when a capacity limit is exceeded, a database unit can automatically request user authorization to delete images based upon relative value indexes. It is possible to combine both approaches. For example, image records can be assigned intrinsic value indexes in a camera and later be reassigned corresponding relative value indexes in a database unit relative to all or a subset of the image records in the database unit.

The value indexes of a particular set of image records can be based upon information limited to an individual user or can be based upon information from a defined group of people or can be based upon information from a large, and possibly unidentified, group of people, such as viewers of a public web site. The inclusion of more or less people is likely to change resulting value indexes. For example, usage of a set of image records by a relatively small social group, such as family members, has a good likelihood of being primarily based upon common interests, such as preserving memories; while usage of the same set of image records by a large group of strangers is more likely to be based upon different interests, such as newsworthiness or artistic merit. Since the value index ordinarily relates to inputs at capture by a single person, the photographer, it is preferred that later modification of resulting value indexes be limited to a group of persons likely to have the same interests as the photographer. This helps maintain the value of the value index for the photographer.

The invention has been described in detail with particular reference to certain preferred embodiments thereof, but it will be understood that variations and modifications can be effected within the spirit and scope of the invention.

The invention claimed is:

1. An image record organization method comprising the steps of:
    capturing a plurality of image records with a camera;
    generating a value index of each of said image records, wherein the value index is automatically derived from one or more of: user inputs to said camera during capture of the respective said image record, usage of a particular image record following capture, semantic image content of the respective said image record, and user reactions to the respective said image record;
    assigning a data set to each of the plurality of image records and defining the data set to include a plurality of image data categories;
    generating the value index for each of the plurality of image records by excluding any of the plurality of image data categories having missing data in the respective data set from the generation of the value index;
    classifying said image records into unacceptable image records having respective said value indexes within a predetermined threshold and acceptable image records having respective said value indexes beyond said threshold;
    selectively displaying on said camera an identification of all of said unacceptable image records; and
    during said displaying, allowing a user to selectively retain or discard all of said unacceptable image records, as a group, while retaining all of said acceptable image records.

2. The method of claim 1 wherein said identification is at least one of: a list of filenames of said unacceptable image records and thumbnails of said unacceptable image records.

3. The method of claim 1 wherein said image records are each one of: a still image, a video sequence, and a multimedia record.

4. The method of claim 1 further comprising allowing user adjustment of said threshold.

5. The method of claim 1 wherein said generating of the value index of each of said image records is automatically derived from image quality data of the respective said image record in addition to one or more of: user inputs to said camera during capture of the respective said image record, image content of the respective said image record, and user reactions to the respective said image record.

6. The method of claim 1 wherein said steps of generating and classifying, are intermittent with said capturing.

7. The method of claim 1 wherein said step of classifying further comprises grouping said unacceptable image records separately from said acceptable image records.

8. The method of claim 1 wherein said classifying further comprises blocking fulfillment of said unacceptable image records.

9. The method of claim 8 wherein said fulfillment includes one or more of: display, printing, transmission to another site, and applying image enhancements.

10. An in-camera image record organization method comprising the steps of:
   accepting a user input setting a value index threshold;
   capturing a plurality of image records with the camera;
   generating a value index of each of said image records, wherein the value index is automatically derived from one or more of: user inputs to said camera during capture of the respective said image record, usage of a particular image record following capture, semantic image content of the respective said image record, and user reactions to the respective said image record;
   assigning a data set to each of the plurality of image records and defining the data set to include a plurality of image data categories;
   generating the value index for each of the plurality of image records by excluding any of the plurality of image data categories having missing data in the respective data set from the generation of the value index;
   classifying said image records into unacceptable image records having respective said value indexes within said threshold and acceptable image records having respective said value indexes beyond said threshold; and
   separating said unacceptable image records from said acceptable image records.

11. The method of claim 10 wherein said separating further comprises discarding said unacceptable image records while retaining said acceptable image records in said camera.

12. The method of claim 11 wherein said separating further comprises segregating said unacceptable image records in a distinct folder prior to said discarding.

13. The method of claim 10 wherein said image records are each one of: a still image, a video sequence, and a multimedia record.

14. The method of claim 10 wherein the generating of the value index of each of said image records is automatically derived from image quality data of the respective said image in addition to said one or more of: user inputs to said camera during capture of the respective said image record, image content of the respective said image record, and user reactions to the respective said image record.

15. The method of claim 10 wherein said steps of generating and classifying, are intermittent with said capturing.

16. The method of claim 10 wherein said step of classifying further comprises grouping said unacceptable image records separately from said acceptable image records.

17. The method of claim 10 further comprising the steps of:
   selectively displaying indications of said unacceptable image records; and
   during said displaying, accepting a user input selectively authorizing discarding of one or more of said unacceptable image records.

18. The method of claim 10 wherein said classifying further comprises blocking fulfillment of said unacceptable image records.

19. The method of claim 18 wherein said fulfillment includes one or more of: display, printing, transmission to another site, and applying image enhancements.

20. The method of claim 10 wherein said step of separating further comprises automatically discarding said unacceptable image records.

* * * * *

UNITED STATES PATENT AND TRADEMARK OFFICE
CERTIFICATE OF CORRECTION

PATENT NO. : 7,742,083 B2
APPLICATION NO. : 11/403352
DATED : June 22, 2010
INVENTOR(S) : John Randall Fredlund et al.

Page 1 of 1

It is certified that error appears in the above-identified patent and that said Letters Patent is hereby corrected as shown below:

| Column | Line | |
|---|---|---|
| First Page Col. 2 (Other Publications) | 1 | Delete "11/406,686," and insert -- 11/403,686, --, therefor. |
| First Page Col. 2 (Other Publications) | 4 | Delete "Kaufrnami," and insert -- Kaufmann, --, therefor. |

Signed and Sealed this

Sixteenth Day of November, 2010

David J. Kappos
*Director of the United States Patent and Trademark Office*